United States Patent
Liu

(10) Patent No.: US 11,889,947 B2
(45) Date of Patent: Feb. 6, 2024

(54) DUAL BREWING MECHANISM

(71) Applicant: GINO CREATION CO., LTD., Taipei (TW)

(72) Inventor: Kuang-Yu Liu, Taipei (TW)

(73) Assignee: GINO CREATION CO., LTD., Taipei (TW)

( * ) Notice: Subject to any disclaimer, the term of this patent is extended or adjusted under 35 U.S.C. 154(b) by 399 days.

(21) Appl. No.: 17/343,841

(22) Filed: Jun. 10, 2021

(65) Prior Publication Data
US 2022/0039588 A1    Feb. 10, 2022

(30) Foreign Application Priority Data

Aug. 7, 2020  (TW) .................................. 109126782

(51) Int. Cl.
*A47J 31/46*    (2006.01)
*A47J 31/34*    (2006.01)
*A47J 31/057*   (2006.01)

(52) U.S. Cl.
CPC ........... *A47J 31/469* (2018.08); *A47J 31/057* (2013.01); *A47J 31/34* (2013.01); *A47J 31/461* (2018.08)

(58) Field of Classification Search
CPC ...... A47J 31/469; A47J 31/461; A47J 31/057; A47J 31/34
See application file for complete search history.

(56) References Cited

U.S. PATENT DOCUMENTS

| | | | |
|---|---|---|---|
| 6,722,265 B2 * | 4/2004 | Priley ................. | A47J 31/0615 99/305 |
| 2005/0274738 A1 * | 12/2005 | Tomsic ................ | A47J 31/057 222/129.4 |
| 2007/0187421 A1 * | 8/2007 | Constantine ........ | A47J 31/4489 220/573.1 |
| 2017/0020327 A1 * | 1/2017 | Liu ...................... | A47J 31/0663 |
| 2021/0113010 A1 * | 4/2021 | Bindon ................ | A47J 31/02 |
| 2022/0061586 A1 * | 3/2022 | Guglielmino ....... | B08B 3/12 |

\* cited by examiner

*Primary Examiner* — Nathaniel E Wiehe
*Assistant Examiner* — Keith Brian Assante
(74) *Attorney, Agent, or Firm* — Li & Cai Intellectual Property (USA) Office

(57) ABSTRACT

A dual brewing mechanism is provided. The dual brewing mechanism includes a hot water pipe, an espresso brewing device, a first solenoid valve, a pour over device and a second solenoid valve. The espresso brewing device includes a brewing head that has a flow channel configured therein, and hot water can be transported to the flow channel through a first pipe body of the hot water pipe. The first solenoid valve is in communication with the flow channel of the espresso brewing device, the hot water is transported to the pour over device through the second pipe body of the hot water pipe, and the second solenoid valve is in communication with the pour over device.

8 Claims, 7 Drawing Sheets

DUAL BREWING MECHANISM

CROSS-REFERENCE TO RELATED PATENT APPLICATION

This application claims the benefit of priority to Taiwan Patent Application No. 109126782, filed on Aug. 7, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a dual brewing mechanism capable of providing espresso and pour over coffee.

BACKGROUND OF THE DISCLOSURE

For a coffee shop to provide espresso and pour over coffee, an espresso machine and a pour over coffee maker are usually set up in the coffee shop. The pour over coffee maker refers to a device using a mechanical structure to imitate a brewing procedure of the pour over coffee. However, a bar of the coffee shop often has limited space, and needs to be utilized in a cost-effective manner. Placing two devices may take up too much space, especially for small coffee shops that may be under limited budget. Each brewing device of a conventional espresso machine has a hot water supply mechanism that includes a motor pump, a backstop pressure relief valve, a flow meter, and a hot water boiler.

SUMMARY OF THE DISCLOSURE

In response to the above-referenced technical inadequacy, the present disclosure provides a dual brewing mechanism for providing espresso and pour over coffee (or pour over beverages of other ingredients), so as to increase device functions, save space, and lower the cost.

In one aspect, the present disclosure provides a dual brewing mechanism that includes a hot water pipe, an espresso brewing device, a first solenoid valve, a pour over device, and at least one second solenoid valve. The hot water pipe includes a hot water input, a first pipe body, and a second pipe body. One end of the first pipe body and one end of the second pipe body are in communication with the hot water input, and hot water is transported to the first pipe body and the second pipe body through the hot water input. The espresso brewing device includes a brewing head. A flow channel is located inside the brewing head. A water inlet is formed at one end of the flow channel, and the water inlet is in communication with another end of the first pipe body. The hot water is transported to the flow channel through the first pipe body, and at least one water outlet is formed at another end of the flow channel. The first solenoid valve is in communication with the flow channel of the espresso brewing device. When the first solenoid valve is turned on, the hot water flows through the flow channel of the espresso brewing device and is outputted from the water outlet for extracting coffee. The pour over device is connected to another end of the second pipe body, and the hot water is transported to the pour over device through the second pipe body. The at least one second solenoid valve is in communication with the pour over device. When the second solenoid valve is turned on, the hot water flows through the pour over device and the pour over device outputs the hot water to extract ingredients by imitating a pour over ingredient brewing procedure.

Therefore, an advantageous effect of the present disclosure is that, a hot water pipe only needs to be connected to one hot water supply mechanism to supply hot water to one espresso brewing device and one pour over device. One of the espresso brewing device and the pour over device can be operated at a time, so as to achieve the purpose of supplying espresso or pour over coffee (or pour over beverages of other ingredients) from one beverage device. The one beverage device can include one or more espresso brewing devices and pour over devices, thereby increasing device functions, saving space, and lowering the cost.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
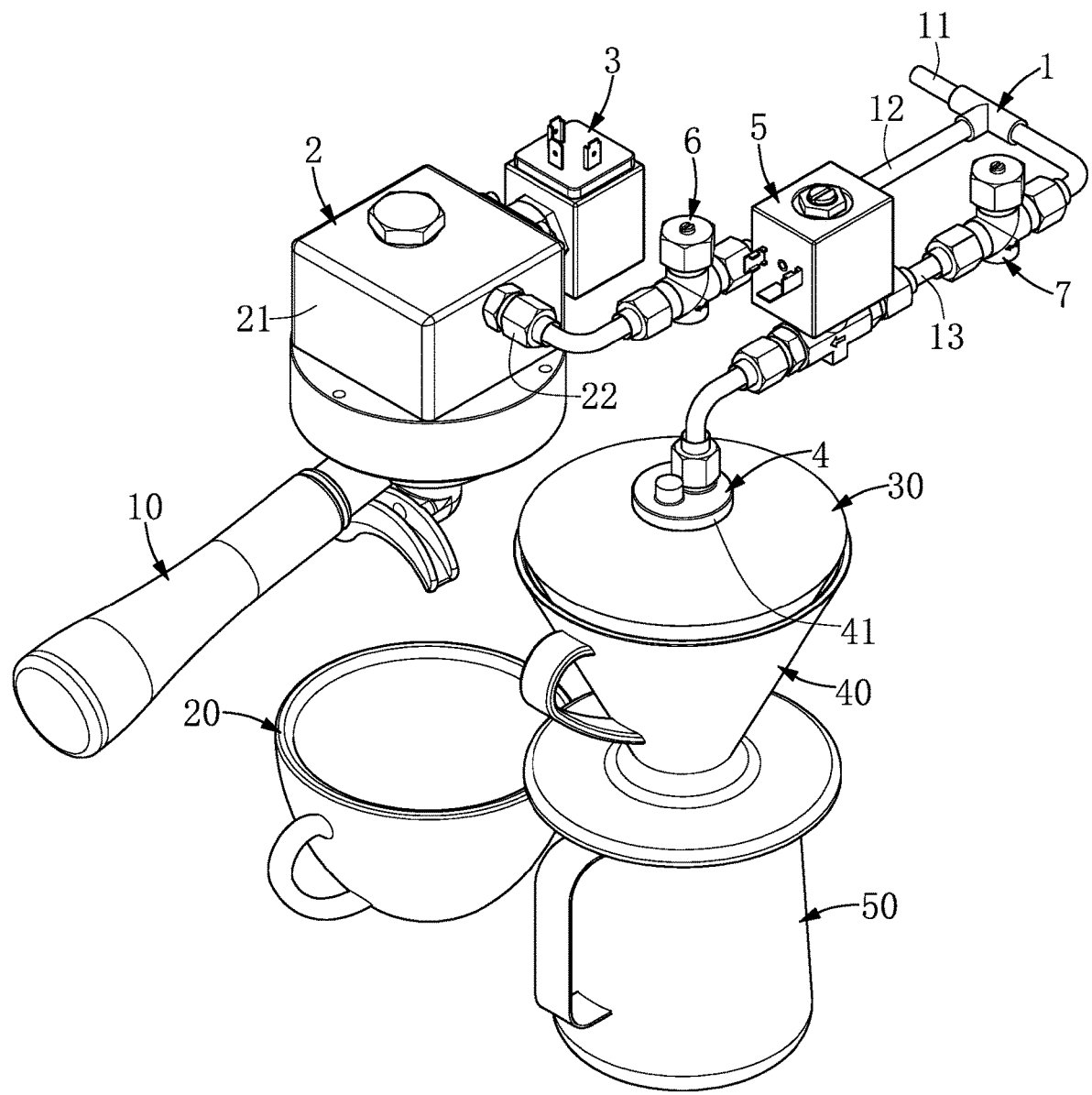
FIG. 1 is a perspective view of a dual brewing mechanism according to a first embodiment of the present disclosure.
Figure 2:
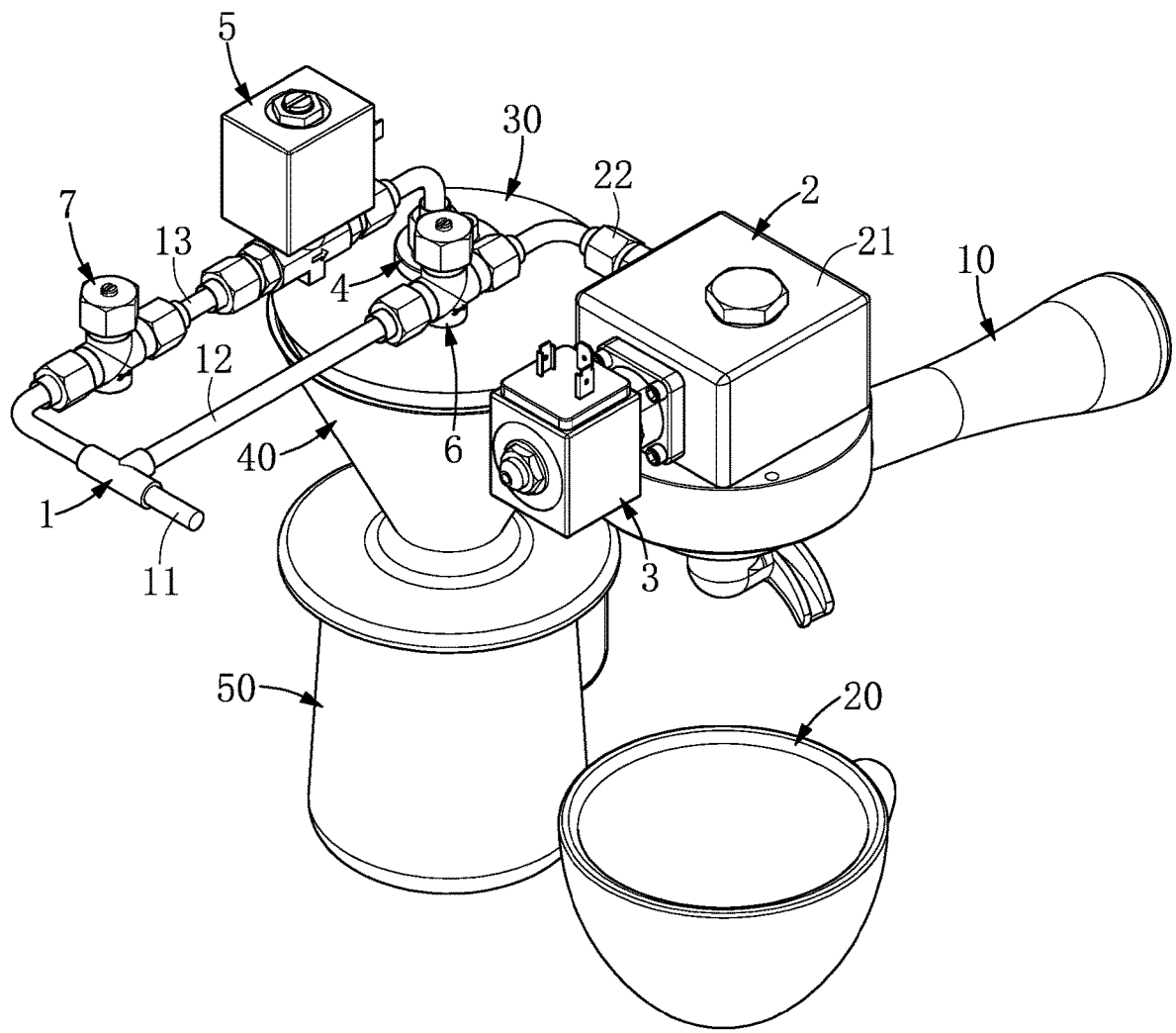
FIG. 2 is another perspective view of the dual brewing mechanism according to the first embodiment of the present disclosure.
Figure 3:
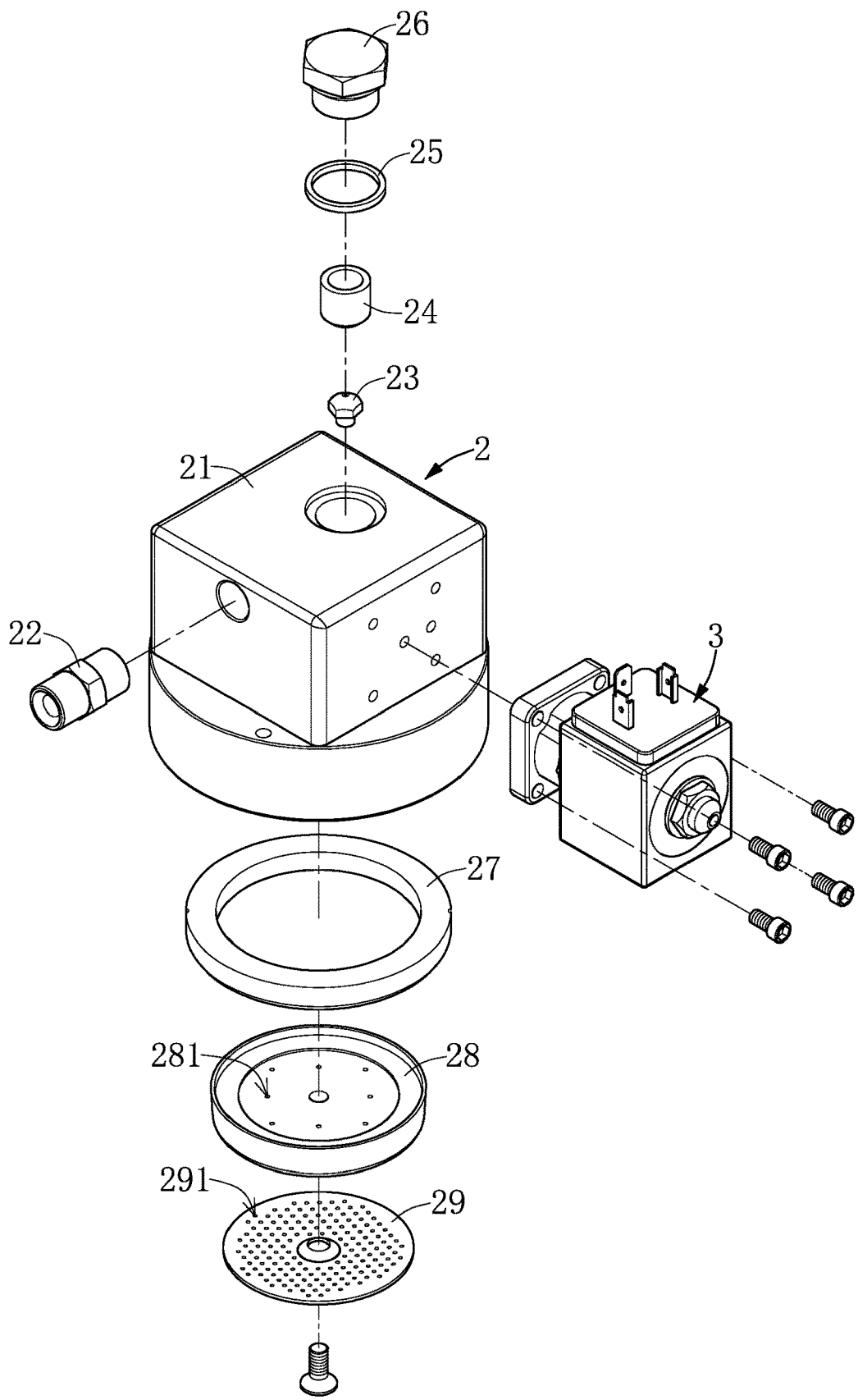
FIG. 3 is an exploded perspective view of an espresso brewing device according to the first embodiment of the present disclosure.
Figure 4:
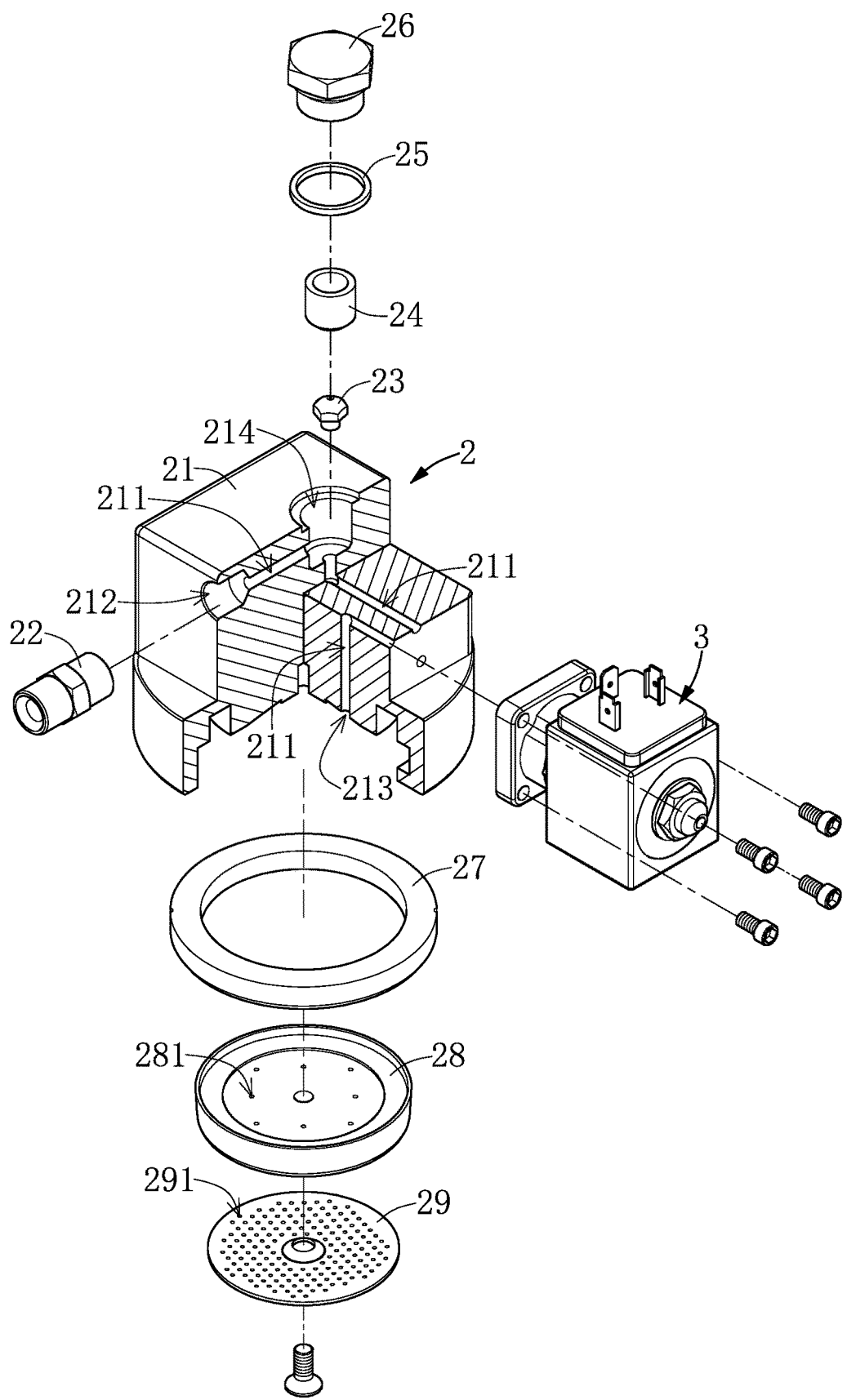
FIG. 4 is another exploded perspective view of the espresso brewing device according to the first embodiment of the present disclosure.
Figure 5:
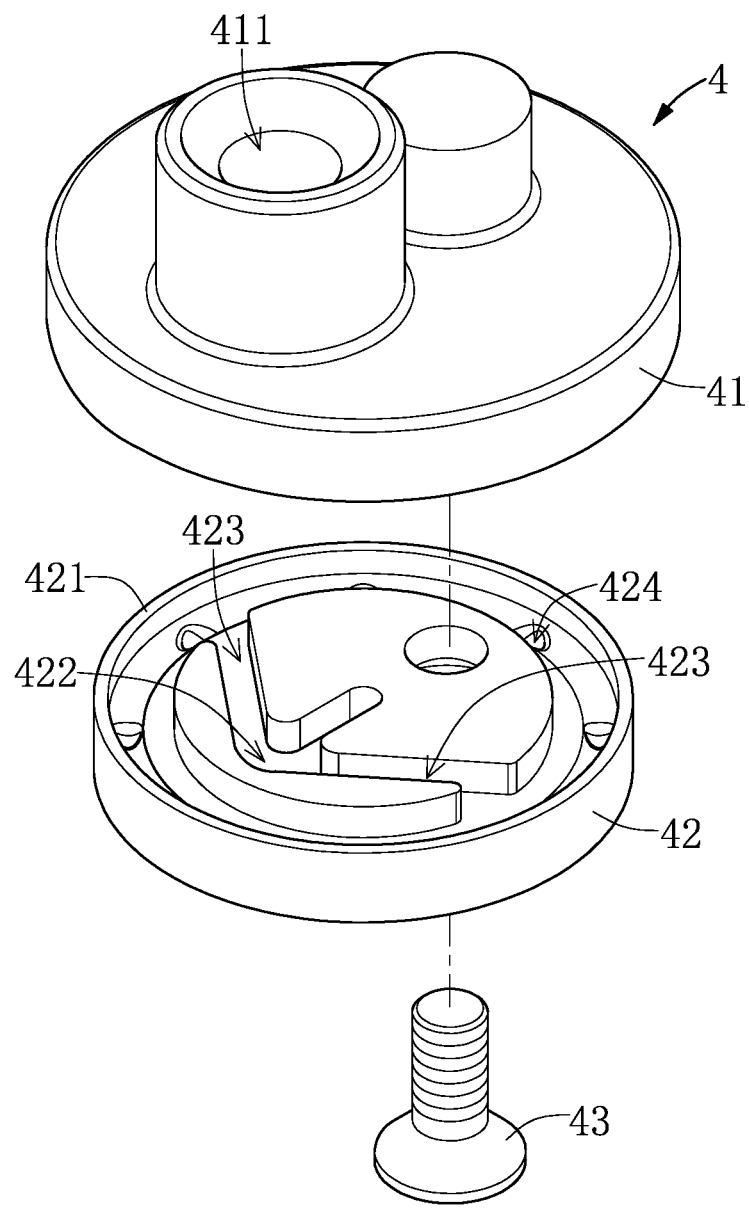
FIG. 5 is an exploded perspective view of a water injection head according to the first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Referring to FIG. 1 to FIG. 5, the present disclosure provides a dual brewing mechanism that includes a hot water pipe 1, an espresso brewing device 2, a first solenoid valve 3, a pour over device 4, and at least one second solenoid valve 5.

The hot water pipe 1 includes a hot water input 11, a first pipe body 12, and a second pipe body 13. The hot water input 11 can be connected to a hot water supply mechanism (omitted in the figures) for transporting hot water to the hot water pipe 1. One end of the first pipe body 12 and one end of the second pipe body 13 are in communication with the hot water input 11, and the hot water can be transported to the first pipe body 12 and the second pipe body 13 through the hot water input 11.

The espresso brewing device 2 is connected to another end of the first pipe body 12, so that the hot water can be transported to the espresso brewing device 2 through the first pipe body 12. The espresso brewing device 2 includes a brewing head 21. A flow channel 211 is located inside the brewing head 21. A water inlet 212 is formed at one end of the flow channel 211, and the water inlet 212 is in communication with another end of the first pipe body 12 through a connector 22, so that the hot water can be transported to the flow channel 211 through the first pipe body 12. At least one water outlet 213 is formed at another end of the flow channel 211, and the water outlet 213 penetrates out from one side (a bottom side) of the brewing head 21, so that the hot water in the flow channel 211 can be transported to a coffee handle 10 through the water outlet 213. In this way, espresso can be brewed.

The first solenoid valve 3 is in communication with the flow channel 211 of the espresso brewing device 2. The first solenoid valve 3 can be in communication with two ends of the flow channel 211 (i.e., the water inlet 212 and the water outlet 213), and be electrically controlled to allow or stop a flow in the flow channel 211. The first solenoid valve 3 can be a 3-way 2-position solenoid valve or other types of solenoid valves. When the first solenoid valve 3 is turned on, the hot water can flow through the flow channel 211 of the espresso brewing device 2 and be outputted from the water outlet 213 for extracting coffee.

An installation hole 214 is located in the brewing head 21, the flow channel 211 passes through the installation hole 214, a nozzle 23 and a filter 24 are disposed in the installation hole 214, and one end (an open end) of the installation hole 214 is sealed by an O-ring 25 and a bolt 26. By having the nozzle 23 configured in the installation hole 214, when the first solenoid valve 3 is turned on, a hot water flow is throttled by the nozzle 23 and outputted through the water outlet 213 at an appropriate flow rate. The filter 24 provides a water filtering function, so that the water outlet 213 can output clean hot water.

The brewing head 21 further includes a sealing gasket 27 to prevent accidental leakage of hot water for brewing beverages. One side (a bottom side) of the brewing head 21 includes a flow divider 28 and a flow diversion mesh 29 installed by manners such as screwing, etc. The flow divider 28 and the flow diversion mesh 29 are located on an outer side of the water outlet 213 to form a diversion device. The flow divider 28 has a plurality of flow diversion holes 281, and the flow diversion mesh 29 has a plurality of mesh holes 291. The flow divider 28 and the flow diversion mesh 29 can cooperate with each other and allow the hot water outputted from the water outlet 213 to be evenly and dispersedly sprayed.

The pour over device 4 is connected to another end of the second pipe body 13, so that the hot water can be transported to the pour over device 4 through the second pipe body 13. The pour over device 4 refers to a device capable of brewing the flavor and taste of pour over coffee (or ingredients), and the term pour over refers to obtaining a brewing effect similar to that of a common pour over coffee when a pour over mechanism is used to execute an automatic brewing procedure. A structure of the pour over device is not limited herein. The pour over device 4 includes a water injection head cover 41 and a water injection seat 42, and the water injection head cover 41 has at least one water inlet hole 411. The water inlet hole 411 penetrates a top side and a bottom side of the water injection head cover 41, and the water inlet hole 411 is located at an eccentric position of the water injection head cover 41. The water inlet hole 411 is connected to the another end of the second pipe body 13, so that the hot water can be transported to the pour over device 4 through the second pipe body 13. The water injection seat 42 is disposed below the water injection head cover 41, and the water injection head cover 41 can be assembled with the water injection seat 42 by, for example, screwing with a screw 43.

The water injection seat 42 has a seat body 421 and a plurality of water injection holes 424, and the water injection seat 42 further includes a water inlet channel 422 and a water diversion channel 423. Preferably, the seat body 421 and the water injection head cover 41 have a round shape. The water injection holes 424 are formed on the seat body 421 and penetrate two sides of the seat body 421. The water injection holes 424 can be arranged to form a ring and can also be arranged to form multiple rings (such as two, three or four rings), but there is no limitation on the number of rings that the water injection holes 424 are arranged to form. Furthermore, the water injection holes 424 are not limited to be in a ring-shaped arrangement, and can be arranged in an array or in other arrangements. The water injection holes 424 are formed on the seat body 421 and near an outer edge of the seat body 421, and the water injection holes 424 penetrate two sides (a top side and a bottom side) of the seat body 421. The hot water can flow in through the water inlet hole 411 and flow to the water injection holes 424, so that the hot water can be outputted through the water injection holes 424.

The water inlet channel 422 and the water diversion channel 423 are located on one side (the top side) of the seat body 421 near the water injection head cover 41, the water inlet channel 422 is in communication with the at least one water inlet hole 411, and the water injection holes 424 are in communication with the water inlet channel 422 through the water diversion channel 423. When performing a pour over procedure, the hot water can flow from the water inlet hole 411 into the water inlet channel 422, and then flow from the water diversion channel 423 to the water injection holes 424, so that the hot water is outputted from the water injection holes 424. By having water flow through the water diversion channel 423, each of the water injection holes 424 can have an even water output. The hot water outputted from the water injection holes 424 can be further transported to a paper filter 30, a pour over filter cup 40, and a beverage cup 50 for brewing the pour over coffee (or ingredients).

The second solenoid valve 5 is in communication with the pour over device 4. The second solenoid valve 5 can be a 2-way 2-position solenoid valve, or other types of solenoid valves. The second solenoid valve 5 can be used to control whether or not to transport the hot water in the second pipe body 13 to the pour over device 4. When the second solenoid valve 5 is turned on, the hot water can flow through the pour over device 4, and the pour over device 4 outputs the hot water by imitating a pour over coffee brewing procedure.

A first throttle valve 6 can be disposed on the first pipe body 12, and the first throttle valve 6 can be used to adjust a flow rate of the hot water to be suitable for brewing the espresso. A second throttle valve 7 can be disposed on the second pipe body 13, and the second throttle valve 7 can be used to adjust the flow rate of the hot water to be suitable for brewing the pour over coffee (or ingredients). The first throttle valve 6 and the second throttle valve 7 can also be replaced by throttle connectors having appropriate diameters.

When brewing the espresso, an appropriate amount of coffee powder is filled in the coffee handle 10, and the coffee handle 10 is installed on the brewing head 21 of the espresso brewing device 2. Then, an espresso operation button (omitted in the figures) is pressed, and the first solenoid valve 3 is turned on. At the same time, a motor pump of the hot water supply mechanism (omitted in the figures) is activated, so that the hot water flows through the espresso brewing device 2 to extract coffee, and a coffee liquid flows to the coffee cup 20. An automatic control system is used to execute a default espresso brewing procedure, and when the espresso brewing procedure is executed, the automatic control system turns off the first solenoid valve 3 and the motor pump.

When brewing the pour over coffee, the paper filter 30 is placed in the pour over filter cup 40. The pour over filter cup 40 can be a commercially available pour over filter cup of any brand or design. The specifications of the paper filter 30 needs to match the pour over filter cup 40 of a suitable brand. An appropriate amount of the coffee powder is placed in the paper filter 30, and the pour over filter cup 40 is placed on the beverage cup 50. The pour over filter cup 40 and the beverage cup 50 are placed beneath the pour over device 4. A pour over coffee operation button (omitted in the figures) is pressed, and the second solenoid valve 5 is turned on. At the same time, the motor pump of the hot water supply mechanism (omitted in the figures) is activated, so that the hot water flows through the pour over filter cup 40 to extract coffee, and the coffee liquid flows to the beverage cup 50. The automatic control system is used to execute a default pour over coffee brewing procedure, and when the pour over coffee brewing procedure is executed, the automatic control system turns off the second solenoid valve 5 and the motor pump.

Second Embodiment

Figure 6:
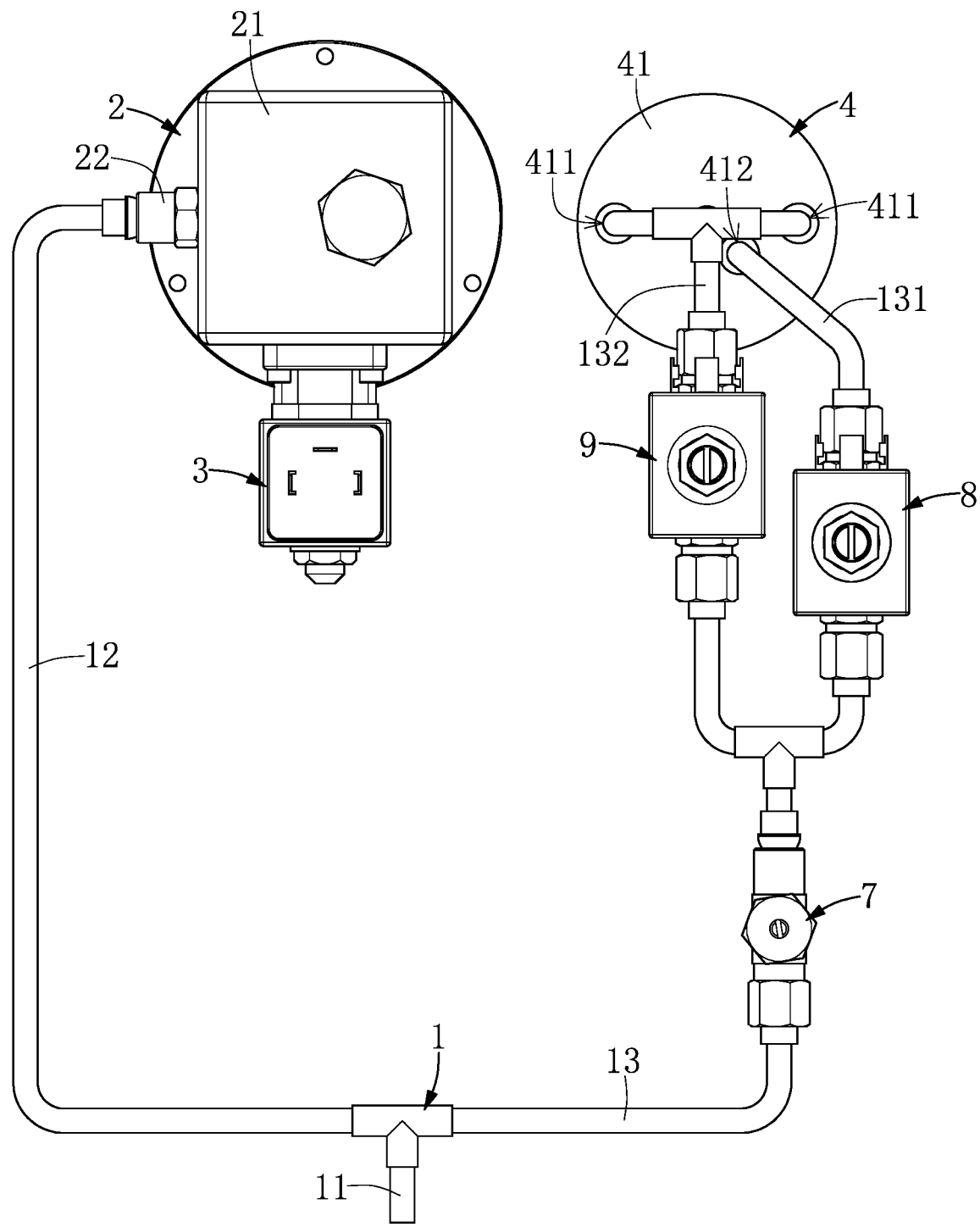
FIG. 6 is top view of the dual brewing mechanism according to a second embodiment of the present disclosure.
Figure 7:
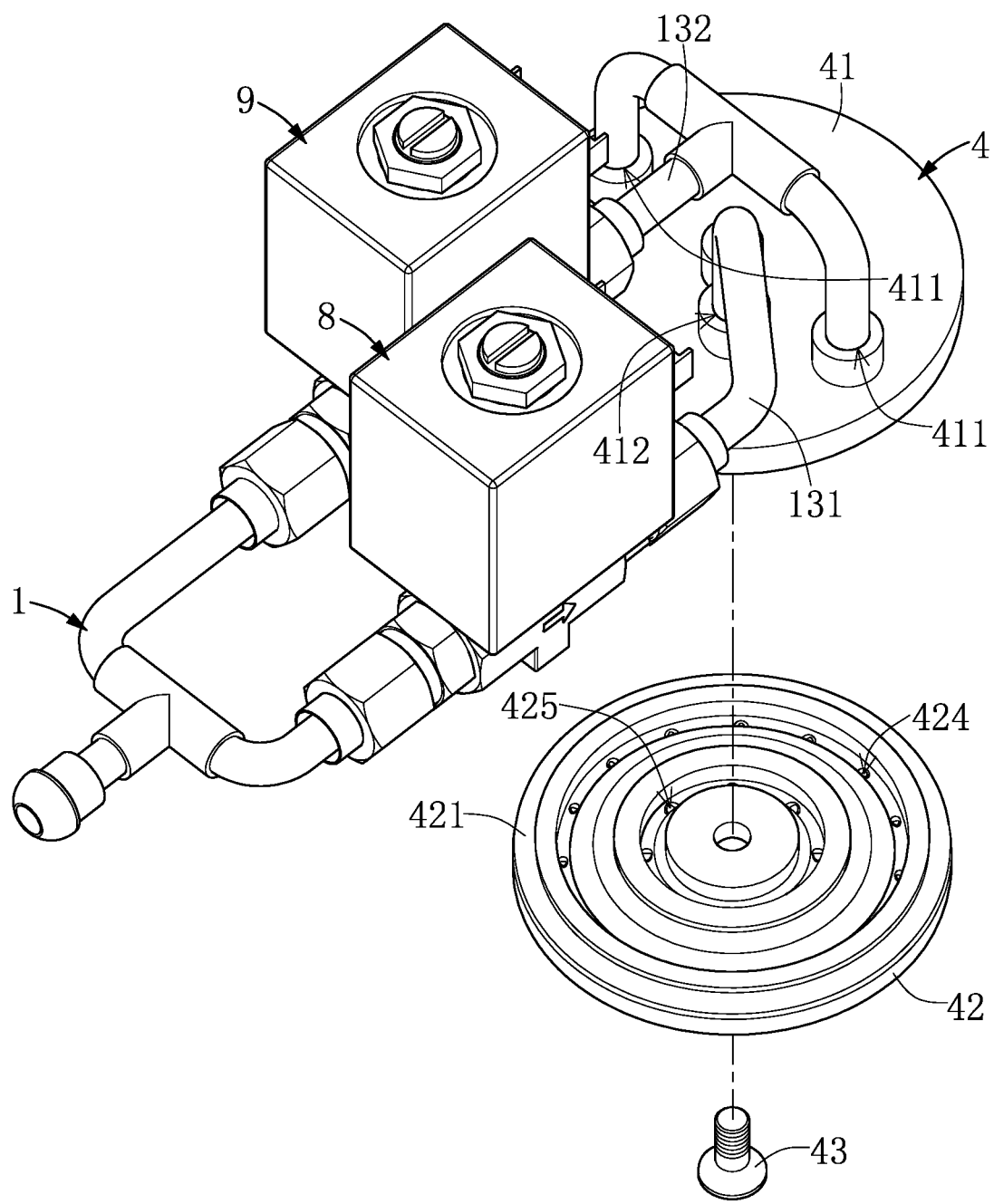
FIG. 7 is a perspective view of the dual brewing mechanism according to the second embodiment of the present disclosure.

Referring to FIG. 6 and FIG. 7, the espresso brewing device 2 can be without the above-mentioned first throttle valve, so that the first throttle valve disposed on the first pipe body 12 is omitted. Since the espresso brewing device 2 is without the throttle valve, a flow speed of the hot water for brewing can be controlled through the coarseness of the grounded coffee powder. The pour over device 4 still has the second throttle valve 7 disposed thereon for controlling the flow rate of the hot water.

For water injection, the pour over device 4 can also be designed to have two or more than two water injection channels. In this embodiment, there are two sets of water injection channels. That is, the second pipe body 13 of the hot water pipe 1 includes an inner ring hot water pipe 131 and an outer ring hot water pipe 132, and the pour over device 4 is connected to the inner ring hot water pipe 131 and the outer ring hot water pipe 132 of the second pipe body 13, so that the hot water can be transported to the pour over device 4 through the inner ring hot water pipe 131 and the outer ring hot water pipe 132 of the second pipe body 13. The water injection head cover 41 has two water inlet holes 411 and one water inlet hole 412, the two water inlet holes 411 are connected to the outer ring hot water pipe 132, and the water inlet hole 412 is connected to the inner ring hot water pipe 131, so that the hot water can be transported to an inner ring and an outer ring of the pour over device 4 respectively through the inner ring hot water pipe 131 and the outer ring hot water pipe 132.

The water injection holes 424 and water injection holes 425 are arranged in multiple rings, and include at least the water injection holes 425 that are located in the inner ring and the water injection holes 424 that are located in the outer ring, which are portions of the water injection holes 424 and 425. The water injection holes 425 located in the inner ring are near a center of the seat body 421, and the water injection holes 424 located in the outer ring are near the outer edge of the seat body 421. The water injection holes 424 located in the outer ring and the water injection holes 425 located in the inner ring are arranged to form two rings, and a quantity of holes for the water injection holes 424 located in the outer ring is greater. The outer ring hot water pipe 132 is in communication with the two water inlet holes 411 and the water injection holes 424 located in the outer ring through two inlets, so that an amount of water for each of the water injection holes 424 is evenly distributed, and the hot water is controlled to be turned on or off by a fourth solenoid valve 9. A quantity of holes for the water injection holes 425 located in the inner ring is less, and the inner ring hot water pipe 131 is in communication with the water inlet hole 412 and the water injection holes 425 located in the inner ring through one inlet, so that an amount of water for each of the water injection holes 425 is evenly distributed, and the hot water is controlled to be turned on or off by a third solenoid valve 8. Depending on types of brewing beverages, different brewing modes are required. The third solenoid valve 8 and the fourth solenoid valve 9 can be turned on and turned off separately or simultaneously, and the water injection holes 424 and the water injection holes 425 for injection of the hot water to the inner ring and the outer ring can be arranged differently and include different quantities of holes. Two flow control valves (omitted in the figures) can be disposed at one end of the third solenoid valve 8 and one end of the fourth solenoid valve 9, respectively, so as to control the required flow rate of the hot water. Or, two throttle valves (omitted in the figures) can be disposed at the one end of the third solenoid valve 8 and the one end of the fourth solenoid valve 9, respectively. A water pouring force from the water injection holes 424 and the water injection holes 425 are low when the third solenoid valve 8 and the fourth solenoid valve 9 are turned on simultaneously. If only one of the third solenoid valve 8 or the fourth solenoid valve 9 is turned on, a water injection force is greater due to having the same flow rate but having water injected through fewer water injection holes, thereby achieving an effect of stirring the coffee powder. On the other hand, a water injection hole (not shown in the figures) having a larger flow rate can be further disposed at a center position on the water injection seat 42, and a solenoid valve (omitted in the figures) can be installed to operate the single water injection hole having a larger flow rate, thereby also achieving the effect of stirring the ingredients.

BENEFICIAL EFFECTS OF THE EMBODIMENTS

An advantageous effect of the present disclosure is that, one hot water supply mechanism is used to supply hot water to one espresso brewing device and one pour over device. One of the espresso brewing device and the pour over device can be operated at a time, so as to achieve the purpose of supplying espresso or pour over coffee (or pour over beverages of other ingredients) from one beverage device. The one beverage device can include one or more espresso brewing devices and pour over devices, thereby increasing device functions, saving space, and lowering the cost. The pour over device is not limited to being used for coffee-brewing, but can also be used for brewing ingredients such as tea leaf, roselle, and *chrysanthemum*.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A dual brewing mechanism, comprising:
a hot water pipe including a hot water input, a first pipe body, and a second pipe body, one end of the first pipe body and one end of the second pipe body being in communication with the hot water input, wherein hot water is transported to the first pipe body and the second pipe body through the hot water input;
an espresso brewing device including a brewing head, wherein a flow channel is located inside the brewing head, a water inlet is formed at one end of the flow channel, and the water inlet is in communication with another end of the first pipe body; wherein the hot water is transported to the flow channel through the first pipe body, and at least one water outlet is formed at another end of the flow channel;
a first solenoid valve being in communication with the flow channel of the espresso brewing device, wherein, when the first solenoid valve is turned on, the hot water flows through the flow channel of the espresso brewing device and is outputted from the water outlet for extracting coffee;
a pour over device connected to another end of the second pipe body, wherein the hot water is transported to the pour over device through the second pipe body; and
at least one second solenoid valve being in communication with the pour over device, wherein, when the second solenoid valve is turned on, the hot water flows through the pour over device, and the pour over device outputs the hot water to extract ingredients by imitating a pour over ingredient brewing procedure;
wherein the pour over device includes a water injection head cover and a water injection seat, the water injection head cover has at least one water inlet hole, and the at least one water inlet hole is connected to the another end of the second pipe body; wherein the water injection seat is disposed below the water injection head cover, and the water injection head cover is assembled with the water injection seat wherein the water injection seat has a seat body and a plurality of water injection holes, the water injection holes are formed on the seat body and arranged to form at least one ring, and the water injection holes penetrate two sides of the seat body; wherein the hot water flows in through the at least one water inlet hole and then flows to the water injection holes, so that the hot water is outputted through the water injection holes;
wherein the water injection seat further includes a water inlet channel and a water diversion channel, and the water inlet channel and the water diversion channel are located on one side of the seat body near the water injection head cover; wherein the water inlet channel is in communication with the at least one water inlet hole, and the water injection holes are in communication with the water inlet channel through the water diversion channel; wherein the hot water flows from the at least one water inlet hole into the water inlet channel, and then flows through the water diversion channel to the water injection holes.

2. The dual brewing mechanism according to claim 1, wherein both the seat body and the water injection head cover have a round shape, and the water injection holes are arranged in multiple rings and include one portion of the water injection holes that are located in an inner ring and another portion of the water injection holes that are located in an outer ring; wherein the water injection holes located in the inner ring are near a center of the seat body, and the water injection holes located in the outer ring are near an outer edge of the seat body.

3. The dual brewing mechanism according to claim 1, wherein the second pipe body of the hot water pipe includes an inner ring hot water pipe and an outer ring hot water pipe, the pour over device is connected to the inner ring hot water pipe and the outer ring hot water pipe of the second pipe body, and the hot water is transported to the pour over device through the inner ring hot water pipe and the outer ring hot water pipe of the second pipe body.

4. The dual brewing mechanism according to claim 3, wherein the water injection head cover has a plurality of water inlet holes respectively connected to the inner ring hot water pipe and the outer ring hot water pipe, and the hot water is transported to an inner ring and an outer ring of the pour over device respectively through the inner ring hot water pipe and the outer ring hot water pipe.

5. The dual brewing mechanism according to claim 4, wherein the outer ring hot water pipe is in communication with two of the water inlet holes and the water injection holes located in the outer ring through two inlets.

6. The dual brewing mechanism according to claim 1, wherein the at least one water inlet hole penetrates a top side and a bottom side of the water injection head cover, and the at least one water inlet hole is located at an eccentric position on the water injection head cover.

7. The dual brewing mechanism according to claim 1, wherein a first throttle valve is disposed on the first pipe body for adjusting a flow rate of the hot water.

8. The dual brewing mechanism according to claim 1, wherein a second throttle valve is disposed on the second pipe body for adjusting a flow rate of the hot water.

* * * * *